(12) United States Patent
Wang et al.

(10) Patent No.: US 9,721,158 B2
(45) Date of Patent: Aug. 1, 2017

(54) 3D TERRAIN MAPPING SYSTEM AND METHOD

(71) Applicant: Caterpillar Inc., Peoria, IL (US)

(72) Inventors: Qi Wang, Pittsburgh, PA (US); Paul Edmund Rybski, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 14/886,192

(22) Filed: Oct. 19, 2015

(65) Prior Publication Data

US 2017/0109577 A1   Apr. 20, 2017

(51) Int. Cl.
| | | |
|---|---|---|
| *G06K 9/00* | (2006.01) | |
| *H04N 7/18* | (2006.01) | |
| *G06T 11/20* | (2006.01) | |
| *G06F 17/30* | (2006.01) | |
| *G06K 9/46* | (2006.01) | |

(52) U.S. Cl.
CPC ... *G06K 9/00476* (2013.01); *G06F 17/30241* (2013.01); *G06F 17/30268* (2013.01); *G06K 9/46* (2013.01); *G06T 11/20* (2013.01); *H04N 7/185* (2013.01); *G06T 2200/04* (2013.01); *G06T 2207/30181* (2013.01)

(58) Field of Classification Search
CPC .. G06T 17/05; G06K 9/00476; G09B 29/106; G06F 17/30241; H03M 1/00
USPC ...................................................... 382/113
See application file for complete search history.

(56) References Cited

U.S. PATENT DOCUMENTS

| | | | |
|---|---|---|---|
| 5,596,494 A * | 1/1997 | Kuo .................. | G01C 11/02 348/144 |
| 7,640,683 B2 | 1/2010 | McCain | |
| 8,351,684 B2 | 1/2013 | Clar et al. | |
| 8,478,492 B2 | 7/2013 | Taylor et al. | |
| 9,465,129 B1 * | 10/2016 | Olsson .................. | G01V 3/15 |
| 2005/0268245 A1 * | 12/2005 | Gipps .................. | G06F 17/5004 715/762 |
| 2011/0137547 A1 * | 6/2011 | Kwon .................. | G01C 11/02 701/532 |
| 2012/0314935 A1 * | 12/2012 | Cheng .................. | G06K 9/00671 382/154 |

FOREIGN PATENT DOCUMENTS

DE   WO 2005091586 A1 *  9/2005  ............. H04L 29/06

* cited by examiner

*Primary Examiner* — Gregory F Cunningham

(57) ABSTRACT

A terrain mapping system includes an aerial system including at least one camera configured to capture a plurality of aerial images of an area and transmit the plurality of aerial images to an image database, a plurality of machines each having a ground control point (GCP) disposed thereon, and each being configured to periodically record a global location of the GCP in a location history database, and a mapping unit configured to construct a preliminary three-dimensional (3D) terrain map based on the plurality of aerial images, detect at least one GCP within at least one aerial image, determine an estimated global location and an accurate global location of the at least one GCP, and calibrate the preliminary 3D terrain map based on the estimated global location and the accurate global location of the at least one GCP.

20 Claims, 7 Drawing Sheets

3D TERRAIN MAPPING SYSTEM AND METHOD

TECHNICAL FIELD

This disclosure relates generated to a 3D terrain mapping system and method and, more particularly, to a 3D terrain mapping system and method using ground control points.

BACKGROUND

Worksites, such as, for example, mine sites, landfills, quarries, construction sites, etc., commonly undergo geographic alteration by machines and/or workers performing various tasks thereon. It is thus useful to generate a three-dimensional (3D) terrain map of these work sites.

Photogrammetry is a technique for generating 3D terrain maps. Generally, photogrammetry generates a 3D terrain map of an area being surveyed by combining a plurality of overlapping aerial images of the area. However, sometimes the 3D terrain map generated by photogrammetry has some errors, which renders the map not accurate enough for some applications. To improve the accuracy of the 3D terrain map, ground control points (GCPs) are used for calibrating the 3D terrain map. The GCPs are landmarks with known accurate global locations, i.e., latitude, longitude, and elevation. They are placed manually at different locations in the area being surveyed. These GCPs are also visible in the 3D terrain map generated by photogrammetry. The difference between the accurate global locations of the GCPs and their estimated locations in the 3D terrain map generated by photogrammetry is used to compensate for errors in the 3D terrain map.

U.S. Pat. No. 5,596,494 (the '494 patent) discloses a method of generating maps using photogrammetry. The method includes navigating flight and acquiring images of terrestrial scenes, setting up and collecting geophysical coordinates of GCPs under flight paths, and processing the acquired images to derive absolute geophysical coordinate information using camera parameters and geophysical coordinates of the GCPs.

However, the method disclosed in the '494 patent requires manually setting up and collecting the geophysical coordinates of the GCPs in an area being surveyed. Because the area being surveyed usually undergoes geographic alterations, the GCPs may be changed or even disappear due to the geographic alterations. Therefore, new GCPs may need to be set up and their geophysical coordinates need to be collected frequently. The process of setting up GCPs and collecting the geophysical coordinates of the GCPs is time-consuming and expensive, or even dangerous, as it requires travel to the area being surveyed with appropriate equipment and personnel.

The disclosed methods and systems are directed to solve one or more of the problems set forth above and/or other problems of the prior art.

SUMMARY

In one aspect, this disclosure is directed to a terrain mapping system. The terrain mapping system includes an aerial system, a plurality of machines, and a mapping unit. The aerial system includes at least one camera configured to capture a plurality of aerial images of an area and transmit the plurality of aerial images to an image database. Each one of the plurality of machines has a ground control point (GCP) disposed thereon, and is configured to periodically record a global location of the GCP in a location history database. The mapping unit is in communication with the image database and the location history database, and is configured to retrieve the plurality of aerial images from the image database, and construct a preliminary three-dimensional (3D) terrain map based on the plurality of aerial images. The mapping unit is also configured to detect at least one GCP within at least one aerial image, determine an estimated global location of the at least one GCP in the preliminary 3D terrain map, and determine an accurate global location of the at least one GCP. The mapping unit is further configured to calibrate the preliminary 3D terrain map based on the estimated global location and the accurate global location of the at least one GCP, and output the calibrated 3D terrain map.

In another aspect, this disclosure is directed to a terrain mapping unit for mapping an area. The terrain mapping unit includes a processor and a non-transitory memory configured to store instructions, that, when executed, enable the processor to retrieve a plurality of aerial images from an image database, the plurality of aerial images being taken by at least one camera on an aerial system. The non-transitory memory is also configured to store instructions to enable the processor to construct a preliminary 3-dimensional (3D) terrain map based on the plurality of aerial images, and detect at least one ground control point (GCP) within at least one aerial image. Each GCP is disposed on a machine which periodically records its location in a location history database. The non-transitory memory is further configured to store instructions to enable the processor to determine an estimated global location of the at least one GCP in the preliminary 3D terrain map, determine an accurate global location of the at least one GCP, calibrate the preliminary 3D terrain map based on the estimated global location and the accurate global location of the at least one GCP, and output the calibrated 3D terrain map.

In yet another aspect, this disclosure is directed to a method for generating a terrain map of an area. The method includes capturing, by at least one camera on an aerial system, a plurality of aerial images of the area, and periodically recording, by a plurality of machines moving around the area, global locations of a plurality of ground control points (GCPs) respectively disposed on the machines. The method also includes constructing, by a mapping unit, a preliminary 3-dimensional (3D) terrain map based on the plurality of aerial images, detecting at least one GCP within at least one aerial image, determining an estimated global location of the at least one GCP in the preliminary 3D terrain map, and determining an accurate global location of the at least one GCP. The method further includes calibrating the preliminary 3D terrain map based on the estimated global location and the accurate global location of the at least one GCP, and outputting the calibrated 3D terrain map.

DETAILED DESCRIPTION

Figure 1:
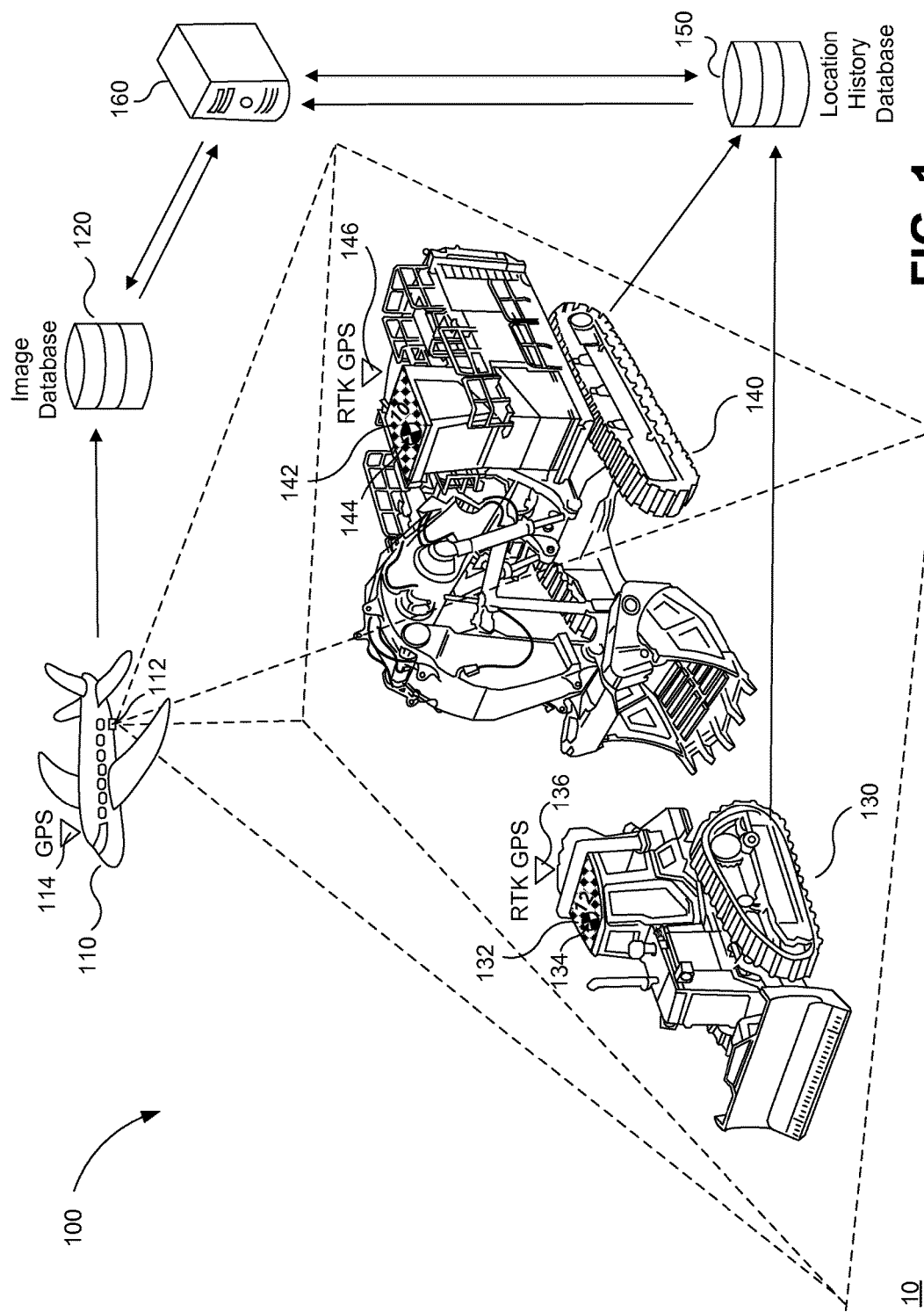
FIG. 1 schematically illustrates a 3D terrain mapping system consistent with a disclosed embodiment.

FIG. 1 schematically illustrates a 3D terrain mapping system 100, consistent with a disclosed embodiment. 3D terrain mapping system 100 is used for generating a 3D terrain map of an area 10. Area 10 may be, for example, a mine site, a landfill, a quarry, a construction site, or any other type of site on which work or labor is performed. As illustrated in FIG. 1, 3D terrain mapping system 100 includes an aerial system 110, an image database 120, machines 130 and 140, a location history database 150, and a mapping unit 160.

Aerial system 110 may be an airplane or an unmanned aerial system (UAS). Aerial system 110 may be equipped with a camera 112 for capturing aerial images of area 10. Aerial system 110 may also include an on-board global positioning system (GPS) receiver 114 for obtaining global location of GPS receiver 114 and time stamp information. Aerial system 110 may be configured to fly over area 10 along a predetermined flight path while camera 112 captures aerial images at a fixed time interval. Each pair of consecutive aerial images taken by camera 112 may overlap with each other such that they can be processed by photogrammetry to obtain a 3D terrain map of area 10. Aerial system 110 may be configured to obtain location information and time stamp information of each aerial image and attach the obtained location information and time stamp information, as image metadata, to the aerial image. The location information of an aerial image may represent a global location of camera 112 that takes the aerial image. The global location may include global coordinates, i.e., latitude, longitude, and elevation, measured by one or more GPS satellites. The global location of camera 112 may be determined based on a global location of GPS receiver 114 and an on-board location of camera 112 with respect to GPS receiver 114. The time stamp information of an aerial image may represent a time when the aerial image was taken. The time stamp information may be GPS time measured by the one or more GPS satellites. Aerial system 110 may transmit the captured aerial images to image database 120 and/or mapping unit 160.

In some embodiments not illustrated in FIG. 1, aerial system may be equipped with more than one cameras configured to capture aerial images simultaneously. The aerial images simultaneously taken by two adjacent cameras may overlap with each other.

Image database 120 may be one or more software and/or hardware components that are configured to store, organize, sort, filter, and/or arrange aerial images transmitted from aerial system 110. For example, image database 120 may store the aerial images and their respective image metadata including the global locations of the cameras taking the aerial images and the time stamps indicating the time when the aerial images were taken.

Machines 130 and 140 may be excavators, loaders, dozers, motor graders, haul trucks, and/or other types of equipment that move around area 10 and perform various tasks in area 10. Machines 130 and 140 may be respectively painted with Ground Control Point (GCP) patterns 132 and 142 on top of machines 130 and 140. GCP patterns 132 and 142 may be configured to be large enough such that, when they are included in an aerial image taken by camera 112 on aerial system 110 flying over area 10, they can be recognized by mapping unit 160 executing, for example, a computer vision program and/or a photogrammetry program. GCP patterns 132 and 142 may respectively include GCPs 134 and 144 that can be detected from GCP patterns 132 and 142 by using the computer vision program. GCP patterns 132 and 142 may include at least one of shapes, one-dimensional bar codes, two-dimensional bar codes, checker board patterns, and numbers.

In some embodiments, GCP patterns 132 and 142 may be the same as each other. Alternatively, in some other embodiments, GCP patterns 132 and 142 may be different from each other. For example, each GCP pattern 132 or 142 may be unique and may be associated with a unique machine identifier. In such case, when mapping unit 160 recognizes a GCP pattern in an aerial image, it may automatically recognize an identifier of the machine on which the GCP pattern is painted. For example, as illustrated in FIG. 1, GCP pattern 132 of machine 130 may include a number "12", indicating that the machine identifier of machine 130 is "12"; and GCP pattern 142 of machine 140 may include a number "10", indicating that the machine identifier of machine 140 is "10". As an alternatively example, GCP patterns 132 and 142 may include different bar codes or different shapes for different machines 130 and 140.

Machines 130 and 140 may respectively include Real Time Kinematic (RTK) GPS receivers 136 and 146 for obtaining global locations of RTK GPS receivers 136 and 146 and time stamp information. The global locations of RTK GPS receivers 136 and 146 may be measured by the one or more GPS satellites. The time stamp information may be GPS time measured by the one or more GPS satellites. Machines 130 and 140 may be respectively configured to determine global locations of GCPs 134 and 144 based on the global locations of RTK GPS receivers 136 and 146 and on-board locations of GCPs 134 and 144 with respect to RTK GPS receivers 136 and 146. Machines 130 and 140 may be respectively configured to record the global locations of GCPs 134 and 144 and their associated time stamp information as location history information of GCPs 134 and 144 in location history database 150 at a fixed time interval, e.g., every second or even more frequently.

Location history database 150 may be one or more software and/or hardware components that are configured to store, organize, sort, filter, and/or arrange the location history information of GCPs 134 and 144 on machines 130 and 140. For example, location history database 150 may include sub-databases respectively associated with machines 130 and 140. Each sub-database may be identified by a machine identifier of the corresponding machine 130 or 140. Each sub-database may be configured to store a plurality of global locations of a GCP 134 or 144 included in the corresponding machine 130 or 140, and time stamp information, e.g., a plurality of time stamps, respectively associated with the plurality of global locations.

Mapping unit 160 may include one or more hardware and/or software components configured to display, collect, store, analyze, evaluate, distribute, report, process, record, and/or sort information related to 3D terrain mapping. Mapping unit 160 may be configured to receive aerial images from aerial system 110, or retrieve aerial images from image database 120, and construct a preliminary 3D terrain map by using the aerial images. Mapping unit 160 may also be configured to calibrate the preliminary 3D terrain map based on the location information of GCPs 134 and 144 on machines 130 and 140. Detailed description regarding the structure and function of mapping unit 160 will be provided with respect to FIG. 3.

Figure 2:
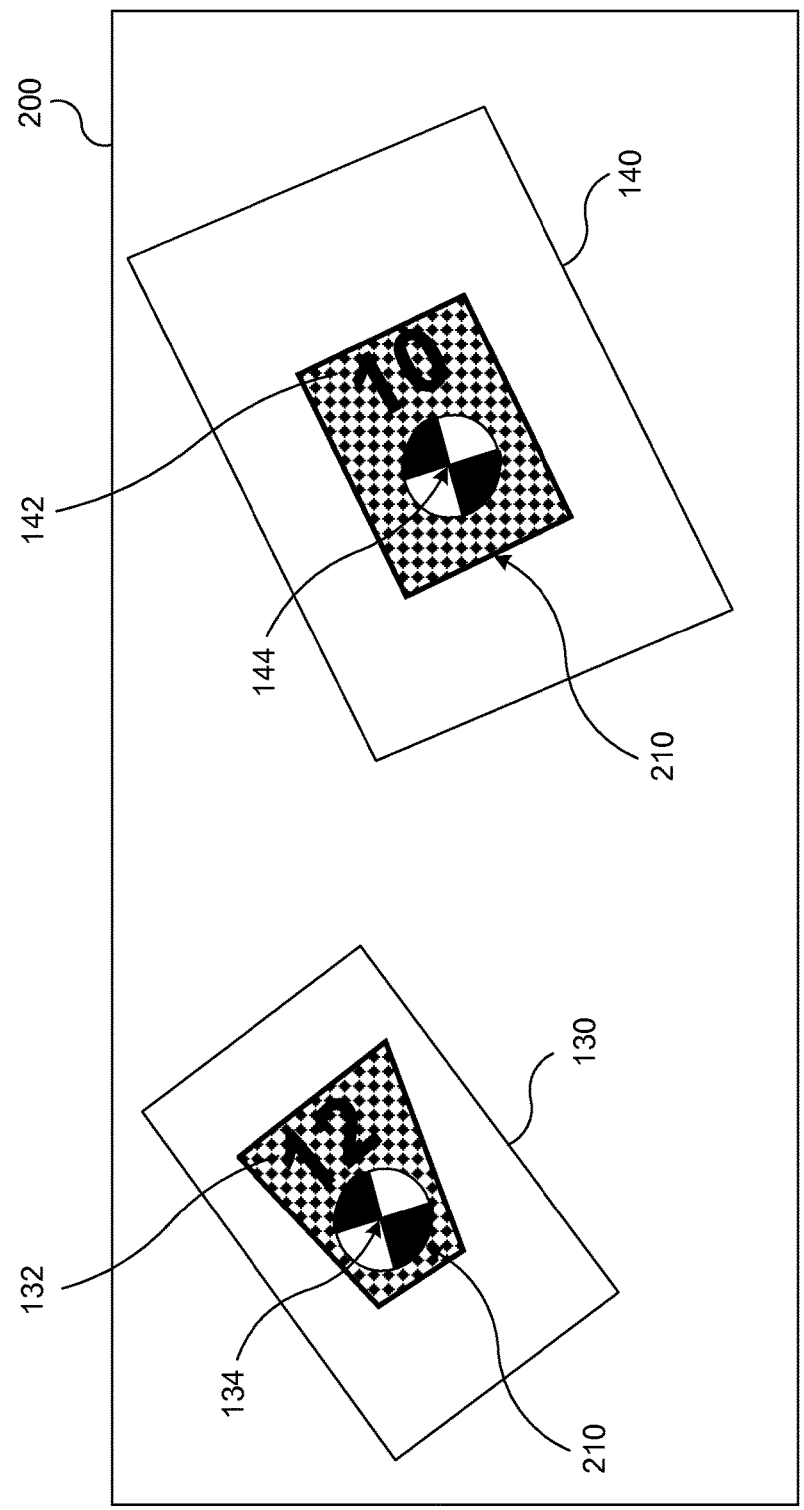
FIG. 2 schematically illustrates an exemplary aerial image taken by camera on an aerial system consistent with a disclosed embodiment.

FIG. 2 schematically illustrates an exemplary aerial image 200 taken by camera 112 on aerial system 110 illustrated in FIG. 1, consistent with a disclosed embodiment. As illustrated in FIG. 2, aerial image 200 may include top views of machine 130 and machine 140. The top view of machine 130 includes GCP pattern 132 including GCP 134 and a number "12" as the identifier of machine 130. GCP 134 may be the center of a circular checkerboard pattern 210 included in GCP pattern 132. When mapping unit 160 detects GCP pattern 132 within aerial image 200, it may detect the circular checkerboard pattern 210 within GCP pattern 132, and then detect the center of the circular checkerboard pattern 210 as GCP 134. The top view of machine 140 includes GCP pattern 142 including GCP 144 and a number "10" as the identifier of machine 140. Similar to GCP 134, GCP 144 may be the center of a circular checkerboard pattern 220 included in GCP pattern 142.

Figure 3:
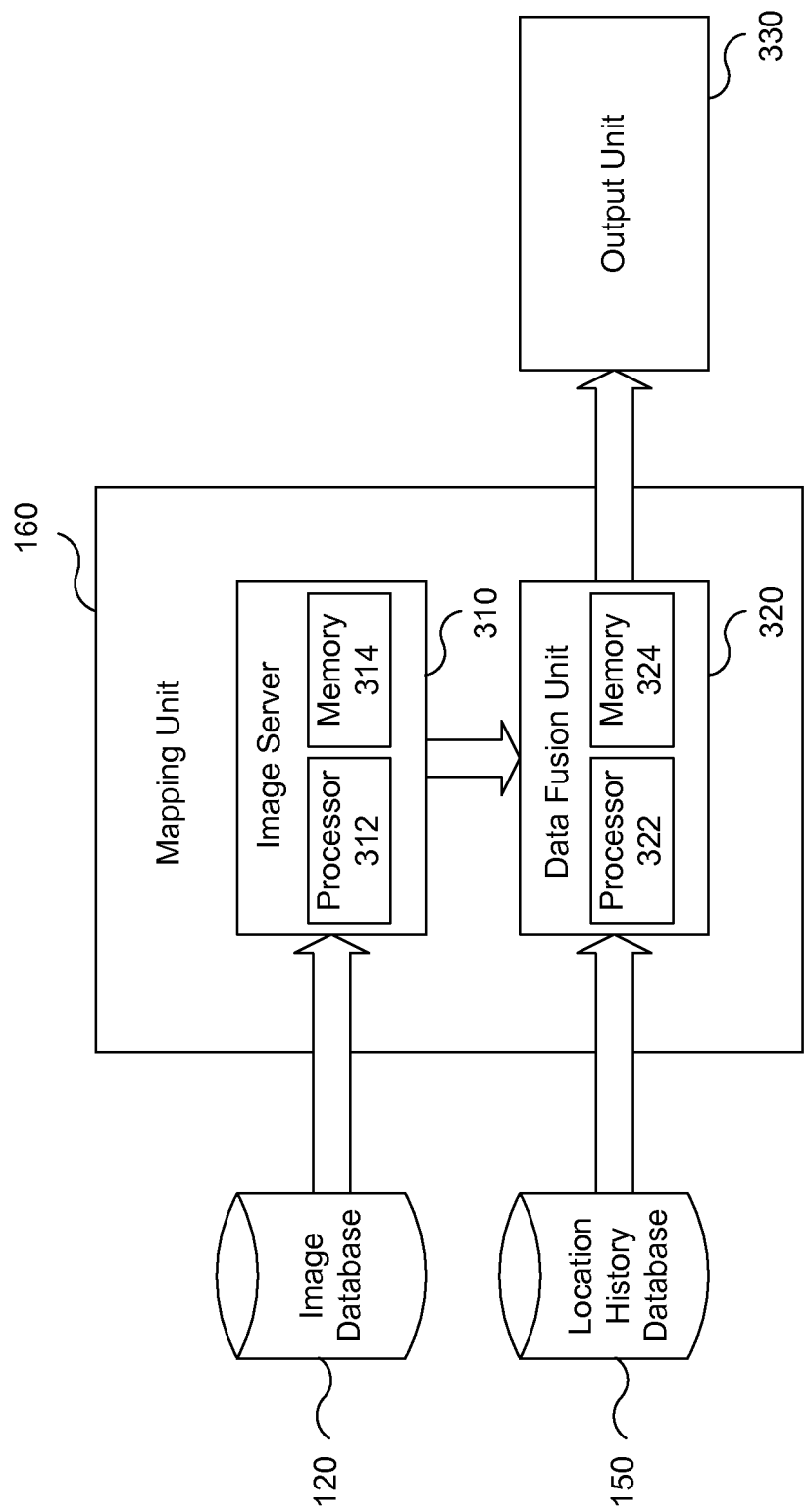
FIG. 3 schematically illustrates an exemplary mapping unit consistent with a disclosed embodiment.

FIG. 3 schematically illustrates an exemplary mapping unit 160 consistent with a disclosed embodiment. As illustrated in FIG. 3, mapping unit 160 may include an image server 310 and a data fusion unit 320. Image server 310 and data fusion unit 320 may respectively include one or more processors 312 and 322 configured to perform various processes and methods consistent with certain disclosed embodiments. In addition, each one of image server 310 and data fusion unit 320 may respectively include one or more transitory or non-transitory memories 314 and 324 configured to store computer program instructions for execution by the respective processors. Image server 310 and data fusion unit 320 may be included in a single computer, or may be separated from each other.

Image server 310 may be communicatively coupled to image database 120 to retrieve a plurality of aerial images from image database 120. Each aerial image may include image metadata including a global location and time stamp. The global location of each aerial image may represent the location of camera 112 when the aerial image was taken. Image server 310 may execute a photogrammetry program to process the aerial images and their respective global locations, to generate a preliminary 3D terrain map of area 10. The preliminary 3D terrain map may include a plurality of surface points of area 10, including surface points of machines 130 and 140 in area 10 as well as GCPs 134 and 144 respectively painted on top of machines 130 and 140. Image server 310 may also determine an estimated global location of each of the surface points and GCPs in the preliminary 3D terrain map based on the global locations of the aerial images. Alternatively, in some embodiments where aerial system 110 includes multiple cameras for taking aerial images, image server 310 may calculate an estimated global location of each surface point based on the aerial images taken by the multiple cameras and the global locations of the respective cameras.

Image server 310 may also search each one of the aerial images for GCP patterns. Once image server 310 finds an aerial image that includes a GCP pattern, image server 310 may search for a GCP within the GCP pattern. Once image server 310 finds a GCP, image server 310 may record the global location and time stamp associated with the aerial image, and 2-dimensional (2D) coordinates of the GCP within the aerial image. If an aerial image includes more than one GCP, image server 310 may determine the 2D coordinates of each one of the GCPs within the aerial image. In some embodiments where machine identifiers are available, i.e., where various GCP patterns are associated with various machine identifiers, image server 310 may perform a pattern recognition program to detect the machine identifier associated with the GCP pattern.

Data fusion unit 320 may be communicatively coupled to image server 310 to retrieve global location and time stamps of the aerial images that include GCPs, and the 2D coordinates of GCPs within the respective aerial images. In some embodiments where machine identifiers are available, data fusion unit 320 may also retrieve the machine identifier associated with each GCP from image server 310.

Data fusion unit 320 may determine an estimated global location of each one of the GCPs that are detected in the aerial images. For example, data fusion unit 320 may determine the estimated global location of a GCP based on the 2D coordinate of the GCP in an aerial image and a global location of a camera that took the aerial image. As another example, data fusion unit 320 may determine that the estimated global location of a GCP is the 3D coordinates of the GCP in the preliminary 3D terrain map generated by image server 310. In some embodiments, a GCP may be included in more than one consecutive aerial image taken by a camera. In addition, since the GCP is painted on a machine which is in motion, image server 310 executing the photogrammetry program may not be able to calculate the 3D coordinates of the GCP directly. Therefore, when a GCP is included in more than one consecutive aerial image, data fusion unit 320 may be configured to choose one (e.g., the first one) of the consecutive aerial images, and project the chosen aerial image onto the preliminary 3D terrain map generated by image server 310 to obtain the 3D coordinates of the projected GCP in the preliminary 3D terrain map.

Data fusion unit 320 may be communicatively coupled to location history database 150 to obtain an accurate global location of each one of the GCPs that are detected in the aerial images, based on the time stamp information associated with the GCP. When a GCP is included in more than one consecutive aerial images and data fusion unit 320 has chosen one of the consecutive aerial images, the time stamp may be the one that is associated with the chosen aerial image.

In some embodiments where machine identifiers are available, data fusion unit 320 may look up location history database 150 to search for a global location that matches the machine identifier and the time stamp associated with the GCP. For example, data fusion unit 320 may look up a sub database in location history database 150 that is associated with the machine identifier to search for a global location that matches the time stamp associated with the GCP. That is, data fusion unit 320 may search for a global location that is associated with a time stamp which is equal to, or approximately equal to, the time stamp associated with the GCP. As used herein, "approximately equal to" refers to a difference between a first time stamp and a second time stamp being within a predetermined error range that is tolerable for mapping unit 160.

In some embodiments where machine identifiers are not available, data fusion unit 320 may look up location history database 150 to search for a global location that matches the time stamp associated with the GCP and is close to the estimated global location of the GCP. That is, data fusion unit 320 may search for a global location that matches the time stamp associated with the GCP, and that is also within a predetermined range around the estimated global location of the GCP. If data fusion unit 320 finds a single global location that matches the time stamp associated with the GCP and is within the predetermined range around the estimated global location of the GCP, data fusion unit 320 may determine that the single global location is the accurate global location of the GCP. If data fusion unit 320 finds more than one global locations that match the time stamp associated with the GCP and are within the predetermined range around the estimated global location of the GCP, data fusion unit 320 may determine that the GCP is useless, and may discard the GCP.

Data fusion unit 320 may calibrate the preliminary 3D terrain map based on the accurate global location of the GCPs and the estimated global location of the GCPs. For example, data fusion unit 320 may calibrate the displacement, orientation, scale, rotation (i.e., roll, pitch, yaw) of the preliminary 3D terrain map. Data fusion unit 320 may perform the calibration based on a difference between the accurate global location of each GCP and the estimated global location of the GCP. In order to perform an accurate calibration, at least three (3) GCPs are needed. In some embodiments where there are more than three (3) GCPs, data fusion unit 320 may perform a filtering process to eliminate GCPs that are less useful for calibrating the 3D terrain map. For example, data fusion unit 320 may eliminate every pair of GCPs having a distance less than a threshold value. The threshold value may be a location estimation error of the preliminary 3D terrain map generated by image server 310 executing the photo photogrammetry program. As another example, data fusion unit 320 may eliminate at least one of the GCPs that are disposed along a single line. As still another example, data fusion unit 320 may eliminate at least one of the GCPs that are disposed on the same plane.

Data fusion unit 320 may be communicatively coupled to output unit 330 to transmit the calibrated 3D terrain map to output unit 330. Output unit 330 may include a display, a printer, or any other devices that can output the calibrated 3D terrain map. For example, output unit 330 may include a graphical user interface (GUI) through which a user can interact with the GUI to tilt, rotate, zoom in, zoom out, elevate, etc., the 3D terrain map, or even adjust the appearance of the 3D terrain map.

INDUSTRIAL APPLICABILITY

The disclosed 3D terrain mapping system 100 may generate an accurate 3D terrain map of an area, without the need to frequently travel to the area to manually set up GCPs and measure the global locations of the GCPs.

Figure 4:
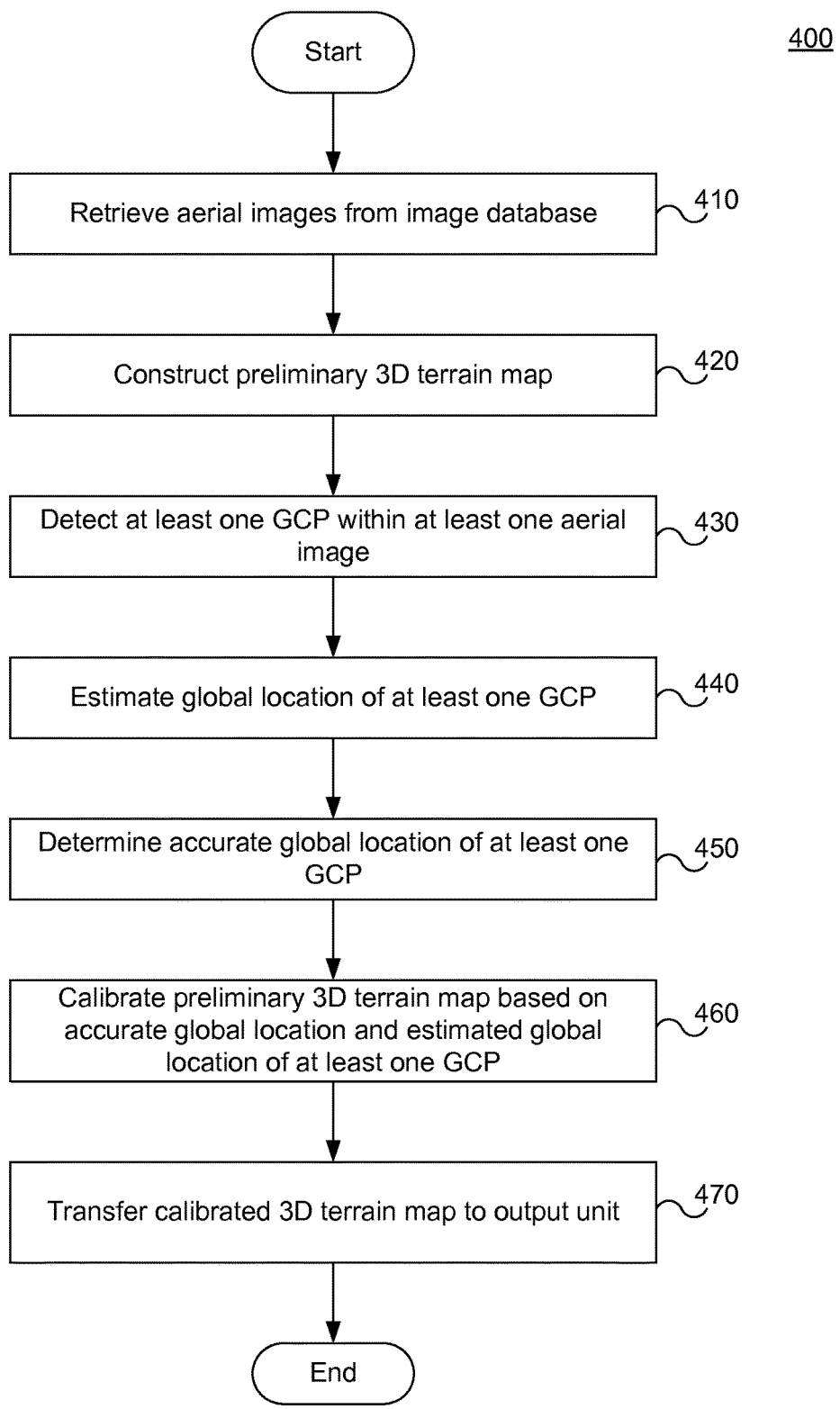
FIG. 4 illustrates a flow chart of an exemplary process of generating a 3D terrain map of an area being surveyed, consistent with a disclosed embodiment.

FIG. 4 illustrates a flow chart of an exemplary process 400 of generating a 3D terrain map of an area being surveyed, consistent with a disclosed embodiment. Process 400 may be implemented when machine identifiers are available, i.e., when machine identifiers are detectable via GCP patterns. Process 400 may be implemented by mapping unit 160.

As illustrated in FIG. 4, mapping unit 160 may first retrieve a plurality of aerial images from image database 120 (step 410). Each aerial image may be tagged with image metadata that includes a global location (e.g., global coordinates) representing the global location of a camera taking the aerial image, and a time stamp representing the time when the aerial image was taken.

At step 420, mapping unit 160 may execute a photogrammetry program to construct a preliminary 3D terrain map by using the plurality of aerial images and their respective global locations. The preliminary 3D terrain map may include a plurality of surface points of the area being surveyed. Mapping unit 160 may also calculate estimated 3D coordinates of these surface points.

At step 430, mapping unit 160 may scan the plurality of aerial images to search for GCPs within the aerial images. As a result of the scan, mapping unit 160 may detect at least one GCP within at least one aerial image. Mapping unit 160 may record the global location and the time stamp of each aerial image that includes a GCP. Mapping unit 160 may also record 2D coordinates of each detected GCP within the corresponding aerial image.

At step 440, mapping unit 160 may estimate a global location of the at least one GCP detected at step 430. In one embodiment, mapping unit 160 may estimate the global location of a GCP by projecting an aerial image including the GCP onto the preliminary 3D terrain map. In an alternative embodiment where aerial system 110 includes multiple cameras for taking aerial images, mapping unit 160 may estimate the global location of a GCP based on the aerial images taken by the multiple cameras and the respective global locations of the multiple cameras.

Figure 5:
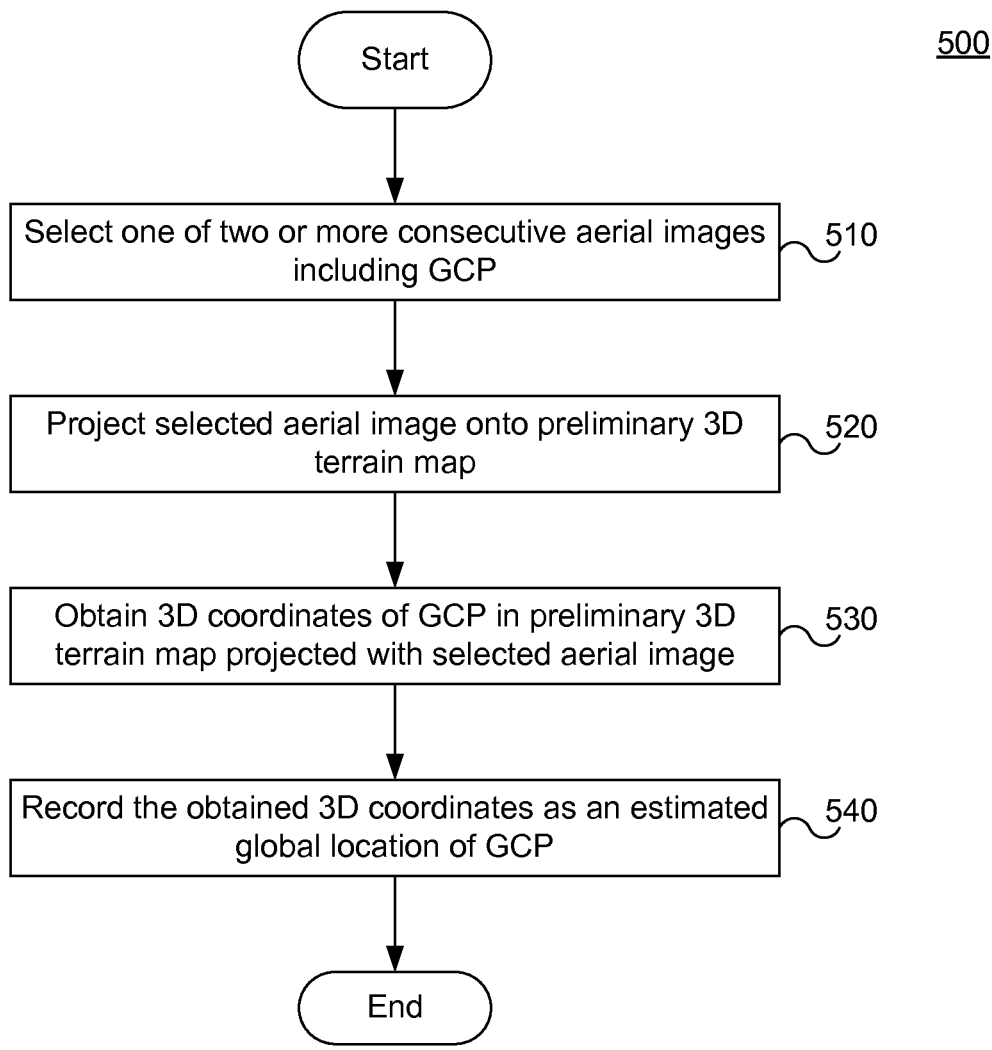
FIG. 5 illustrates a flow chart of an exemplary process of estimating a global location of a GCP, consistent with a disclosed embodiment.

FIG. 5 illustrates a flow chart of an exemplary process 500 of estimating a global location of a GCP by projecting an aerial image including the GCP onto the preliminary 3D terrain map, consistent with a disclosed embodiment. Process 500 may be implemented when the GCP is included in two or more consecutive aerial images.

As illustrated in FIG. 5, mapping unit 160 may first select one of the two or more consecutive aerial images containing the GCP (step 510). For example, mapping unit 160 may select a first one of the consecutive aerial images containing the GCP.

At step 520, mapping unit 160 may project, i.e., overlap, the selected aerial image onto the preliminary 3D terrain map that was constructed at step 420. Mapping unit 160 may determine where to project the aerial image in the preliminary 3D terrain map based on the global location associated with the aerial image and the estimated 3D coordinates of the surface points in the preliminary 3D terrain map. As a result of the projection, the GCP included in the aerial image is also projected onto the preliminary 3D terrain map.

At step 530, mapping unit 160 may obtain the 3D coordinates of the GCP projected in the preliminary 3D terrain map. At step 540, mapping unit 160 may record the obtained 3D coordinates of the GCP as the estimated global location of the GCP. After step 540, mapping unit 160 may finish process 500.

Referring back to FIG. 4, in addition to estimating the global location of the at least one GCP at step 440, mapping unit 160 may also determine an accurate global location of the at least one GCP (step 450). Because the machine identifiers are available, mapping unit 160 may determine the accurate global location of a GCP based on the machine identifier associated with the GCP.

Figure 6:
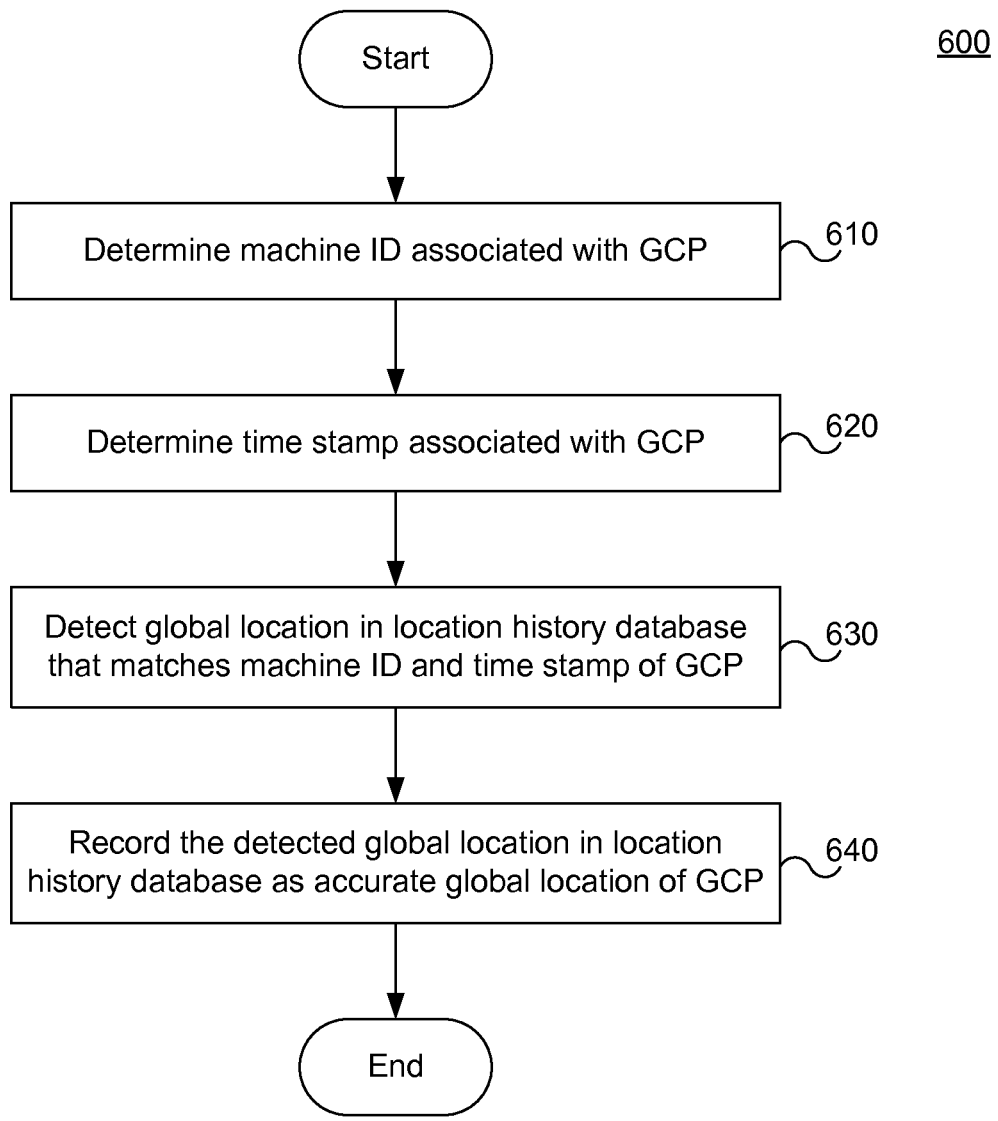
FIG. 6 illustrates a flow chart of an exemplary process of determining an accurate global location of a GCP based on a machine identifier, consistent with a disclosed embodiment.

FIG. 6 illustrates a flow chart of an exemplary process 600 of determining an accurate global location of a GCP based on a machine identifier associated with the GCP, consistent with a disclosed embodiment. As illustrated in FIG. 6, mapping unit 160 may first perform a pattern recognition program to determine a machine identifier associated with the GCP (step 610). For example, mapping unit 160 may include a database configured to store relationships between a plurality of patterns and a plurality of machine identifiers. Once mapping unit 160 detects a GCP pattern surrounding the GCP in an aerial image, mapping unit 160 may look up the database to search for a pattern that matches the GCP pattern, and then retrieve the machine identifier that corresponds to the matched pattern.

At step 620, mapping unit 160 may retrieve a time stamp associated with the GCP. When the GCP is included in two or more consecutive aerial images, mapping unit 160 may select one of the two or more consecutive aerial images containing the GCP, and retrieve a time stamp of the selected aerial image as the time stamp associated with the GCP.

At step 630, mapping unit 160 may detect a global location in location history database 150 that matches the machine identifier and the time stamp associated with the GCP. For example, mapping unit 160 may look up location history database 150 to search for a global location that matches the machine identifier and the time stamp associated with the GCP. In some embodiments where location history database 150 includes a plurality of sub databases respectively corresponding to a plurality of machine identifiers, mapping unit 160 may look up a sub database in location history database 150 that is associated with the machine identifier associated with the GCP to search for a global location that matches the time stamp associated with the GCP. Mapping unit 160 may find a global location that is associated with a time stamp which is equal to, or approximately equal to, the time stamp associated with the GCP.

At step 640, mapping unit 160 may record the global location found in the location history database 150 as the accurate global location of the GCP. After step 640, mapping unit 160 may finish process 600.

Referring back to FIG. 4, after determining the accurate global location of each GCP, mapping unit 160 may calibrate the preliminary 3D terrain map based on the accurate global location and the estimated global location of the at least one GCP detected at step 430 (step 460). Data fusion unit 320 may perform the calibration based on a difference between the accurate global location of each GCP and the estimated global location of the GCP. During the calibration process, data fusion unit 320 may correct errors in displacement, orientation, scale, rotation (i.e., roll, pitch, yaw) of the preliminary 3D terrain map.

Once the 3D terrain map is calibrated, mapping unit 160 may transfer the calibrated 3D terrain map to output unit 330 (step 470). Output unit 330 may include a display, a printer, or any other devices that can output the calibrated 3D terrain map. After step 470, mapping unit 160 may finish process 400.

Figure 7:
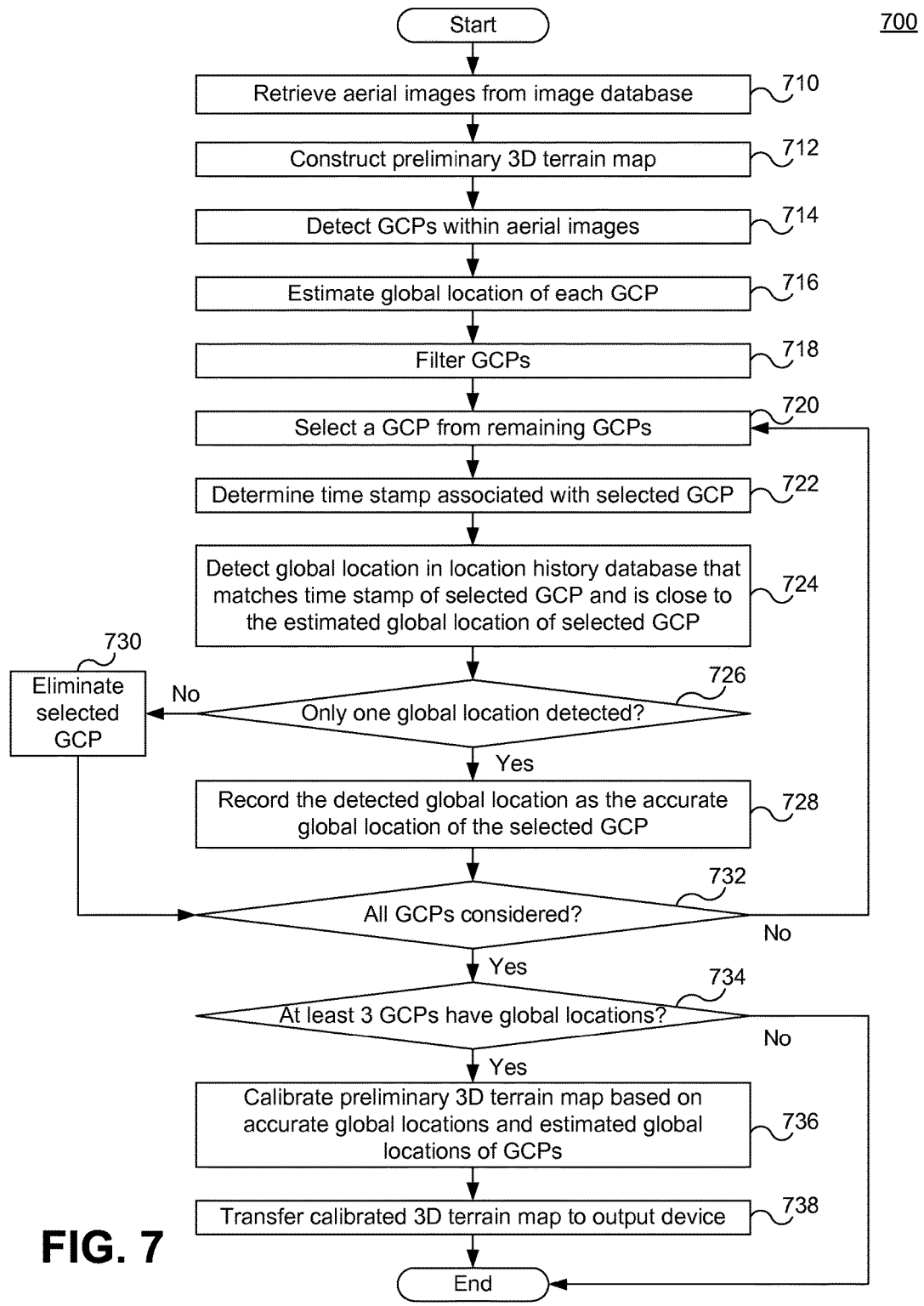
FIG. 7 illustrates a flow chart of an exemplary process of generating a 3D terrain map of an area being surveyed, consistent with a disclosed embodiment.

FIG. 7 illustrates a flow chart of an exemplary process 700 of generating a 3D terrain map of an area being surveyed, consistent with a disclosed embodiment. Process 700 may be implemented when machine identifiers are not available, i.e., when machine identifiers cannot be detected via GCP patterns. Process 700 may be implemented by mapping unit 160.

As illustrated in FIG. 7, mapping unit 160 may first retrieve a plurality of aerial images from image database 120 (step 710). Each aerial image may be tagged with image metadata that includes a global location (e.g., global coordinates) representing the global location of a camera taking the aerial image, and a time stamp representing the time when the aerial image was taken.

At step 712, mapping unit 160 may execute a photogrammetry program to construct a preliminary 3D terrain map by using the plurality of aerial images and their respective global locations. The preliminary 3D terrain map may include a plurality of surface points of the area being surveyed. Mapping unit 160 may also calculate estimated 3D coordinates of these surface points.

At step 714, mapping unit 160 may scan the plurality of aerial images to search for GCPs within the aerial images. As a result of the scan, mapping unit 160 may detect a plurality of GCPs within some of the aerial images. Mapping unit 160 may record the global location and the time stamp of each aerial image that includes a GCP. Mapping unit 160 may also record 2D coordinates of each detected GCP within the corresponding aerial image.

At step 716, mapping unit 160 may estimate a global location of each one of the plurality of GCPs detected at step 714. For example, mapping unit 160 may perform process 500 illustrated in FIG. 5 to estimate the global location of a GCP.

At step 718, mapping unit 160 may perform a filtering process to filter the plurality of GCPs detected at 714 based on their respective estimated global locations. Mapping unit 160 may perform the filtering process according to various criteria. For example, one criterion requires that any two GCPs cannot be too close to each other. Thus, under such criterion, mapping unit 160 may eliminate every pair of GCPs having a distance less than a threshold value. The threshold value may be a location estimation error of the preliminary 3D terrain map. The location estimation error may be determined by mapping unit 160 based on an accuracy level of on-board GPS receiver 114 of aerial system 110, the number of pixels of each one of the aerial images taken by camera 112, the altitude of aerial system 110 when the aerial images were taken, etc.

After the filtering process, mapping unit 160 may select one of the remaining GCPs to determine its accurate global location (step 720). Mapping unit 160 may first determine a time stamp associate with the selected GCP (step 722). When the selected GCP is included in two or more consecutive aerial images, mapping unit 160 may select one of (e.g., a first one of) the two or more consecutive aerial images containing the GCP, and retrieve a time stamp of the selected aerial image as the time stamp associated with the GCP.

At step 724, mapping unit 160 may look up location history database 150 to search for a global location that matches the time stamp associated with the selected GCP and is close to the estimated global location of the selected GCP. That is, mapping unit 160 may search for a global location that matches the time stamp associated with the selected GCP, and that is also within a predetermined range around the estimated global location of the selected GCP. As a result of the searching, mapping unit 160 may find one or more global locations that match the time stamp associated with the selected GCP and are close to the estimated global location of the selected GCP.

At step 726, mapping unit 160 may determine whether only one global location is found at step 724. That is, mapping unit 160 may determine whether there is only one global location in location history database 150 that matches the time stamp associated with the selected GCP and is close to the estimated global location of the selected GCP.

If mapping unit 160 determines that only one global location is found at step 724 (step 726, Yes), mapping unit 160 may record the found global location as the accurate global location of the selected GCP (step 728). Otherwise, if mapping unit 160 determines that multiple global locations are found at step 724 (step 726, No), mapping unit 160 may determine to eliminate the selected GCP (step 730). Then, mapping unit 160 may proceed to step 732.

At step 732, mapping unit 160 may determine whether all of the GCPs have been considered. If not all of the GCPs have been considered (step 732, No), mapping unit 160 may return to step 720 to select another one of the remaining GCPs to determine its global location.

Otherwise, if all of the GCPs have been considered (step 732, Yes), mapping unit 160 may determine whether at least three (3) GCPs have their respective accurate global location determined (step 734). If mapping unit 160 determines that there are less than three (3) GCPs having their respective accurate global location determined (step 734, No), mapping unit 160 may determine that a calibration process cannot be performed to produce accurate results, and then mapping unit 160 may finish process 700.

Otherwise, if mapping unit 160 determines that there are at least three (3) GCPs having their respective accurate global location determined (step 734, Yes), mapping unit 160 may calibrate the preliminary 3D terrain map based on the accurate global locations and the estimated global locations of the GCPs (step 736). Once the 3D terrain map is calibrated, mapping unit 160 may transfer the calibrated 3D terrain map to output unit 330 (step 738). Output unit 330 may include a display, a printer, or any other devices that can output the calibrated 3D terrain map. After step 738, mapping unit 160 may finish process 700.

The disclosed 3D terrain mapping system and method may be applicable to generate a 3D terrain map of any area being surveyed, especially worksites that may undergo geographic alteration by machines. The 3D terrain mapping system 100 may calibrate the 3D terrain map by using GPS generated location of GCPs in the area being surveyed. As a result, the calibrated 3D terrain map is highly accurate.

In addition, in the disclosed 3D terrain mapping system and method, the GCPs for calibrating the 3D terrain map may be set up on machines before the machines are deployed to the area being surveyed. Therefore, the disclosed 3D terrain mapping system and method eliminate the need for frequently traveling to the area to manually set up the GCPs, thus significantly reducing the expense of time and labor for 3D terrain mapping.

Moreover, the disclosed 3D terrain mapping system and method tracks the global locations of the GCPs using GPS on the machines on which the GCPs are disposed. Therefore, the disclosed 3D terrain mapping system and method eliminate the need to manually collect the geophysical coordinates of the GCPs, thus further reducing the expense of time and labor for 3D terrain mapping.

It will be apparent to those skilled in the art that various modifications and variations can be made to the disclosed 3D terrain mapping system and method. Other embodiments will be apparent to those skilled in the art from consideration of the specification and practice of the disclosed parts forecasting system. It is intended that the specification and examples be considered as exemplary only, with a true scope being indicated by the following claims and their equivalents.

What is claimed is:

1. A terrain mapping system, comprising:
    an aerial system comprising at least one camera configured to capture a plurality of aerial images of an area and transmit the plurality of aerial images to an image database;
    a plurality of machines each having a ground control point (GCP) disposed thereon, and each being configured to periodically record a global location of the GCP in a location history database; and
    a mapping unit in communication with the image database and the location history database, and configured to:
        retrieve the plurality of aerial images from the image database;
        construct a preliminary three-dimensional (3D) terrain map based on the plurality of aerial images;
        detect at least one GCP within at least one aerial image;
        determine an estimated global location of the at least one GCP in the preliminary 3D terrain map;
        determine an accurate global location of the at least one GCP;
        calibrate the preliminary 3D terrain map based on the estimated global location and the accurate global location of the at least one GCP; and
        output the calibrated 3D terrain map.

2. The system of claim 1, wherein the aerial system includes a Global Positioning System (GPS) receiver for receiving global location of the GPS receiver and time information, and
    wherein the aerial system is configured to:
        attach location information and a time stamp to each aerial image, the location information attached to an aerial image representing a global location of a camera when taking the aerial image, and the time stamp attached to an aerial image representing the time when the aerial image was taken.

3. The system of claim 1, wherein the preliminary 3D terrain map includes a plurality of surface points of the area, each surface point being associated with 3D coordinates within the preliminary 3D terrain map.

4. The system of claim 1, wherein, when the mapping unit detects a GCP within an aerial image, the mapping unit is configured to:
    record a global location and a time stamp of the aerial image, and two-dimensional (2D) coordinates of the GCP within the aerial image.

5. The system of claim 1, wherein, in the step of determining an estimated location of the at least one GCP in the preliminary 3D terrain map, the mapping unit is configured to:
    project an aerial image including a GCP onto the preliminary 3D terrain map;
    obtain 3D coordinates of the GCP projected onto the preliminary 3D terrain map; and
    record the obtained 3D coordinates of the GCP as an estimated location of the GCP.

6. The system of claim 1, wherein each machine has a GCP pattern disposed on top of the machine, and each GCP pattern contains a GCP, and
    wherein, in the step of detecting at least one GCP within at least one aerial image, the mapping unit is configured to:
        detect a GCP pattern within an aerial image; and
        detect the GCP contained in the GCP pattern.

7. The system of claim 1, wherein each machine includes a GCP pattern associated with a unique machine identifier, and
    wherein, in the step of determining an accurate global location of at least one GCP, the mapping unit is configured to:
        determine a machine identifier associated with a machine having a GCP based on a GCP pattern disposed on the machine;
        determine a time stamp associated with the GCP, the time stamp indicating the time when an aerial image including the GCP was taken;
        detect a global location in the location history database that matches the time stamp and the machine identifier associated with the GCP; and
        record the detected global location as an accurate global location of the GCP.

8. The system of claim 6, wherein the GCP pattern includes at least one of shapes, bar codes, and numbers.

9. The system of claim 1, wherein the mapping unit is further configured to:
   determine a location estimation error value of the preliminary 3D terrain map; and
   eliminate a pair of GCPs having a distance less than the location estimation error value.

10. The system of claim 1, wherein, in the step of determining an accurate global location of the at least one GCP, the mapping unit is configured to:
    determine a time stamp associated with a GCP, the time stamp indicating the time when an aerial image including the GCP was taken;
    detect a global location in the location history database that matches the time stamp associated with the GCP, and is close to the estimated global location of the GCP; and
    record the detected global location as the accurate global location of the GCP.

11. A terrain mapping unit for mapping an area, comprising:
    a processor;
    a non-transitory memory configured to store instructions, that, when executed, enable the processor to:
      retrieve a plurality of aerial images from an image database, the plurality of aerial images being taken by at least one camera on an aerial system;
      construct a preliminary 3-dimensional (3D) terrain map based on the plurality of aerial images;
      detect at least one ground control point (GCP) within at least one aerial image, each GCP being disposed on a machine which periodically records its location in a location history database;
      determine an estimated global location of the at least one GCP in the preliminary 3D terrain map;
      determine an accurate global location of the at least one GCP;
      calibrate the preliminary 3D terrain map based on the estimated global location and the accurate global location of the at least one GCP; and
      output the calibrated 3D terrain map.

12. The terrain mapping unit of claim 11, wherein the non-transitory memory is further configured to store instructions that enable the processor to:
    when a GCP is detected within an aerial image, record a global location and a time stamp of the aerial image, and two-dimensional (2D) coordinates of the GCP within the aerial image.

13. The terrain mapping unit of claim 11, wherein the non-transitory memory is further configured to store instructions that enable the processor to:
    project an aerial image including a GCP onto the preliminary 3D terrain map;
    obtain 3D coordinates of the GCP projected onto the preliminary 3D terrain map; and
    record the obtained 3D coordinates of the GCP as an estimated location of the GCP.

14. The terrain mapping unit of claim 11, wherein each machine includes a GCP pattern associated with a unique machine identifier, and
    wherein the non-transitory memory is further configured to store instructions that enable the processor to:
      determine a machine identifier associated with a machine having a GCP based on a GCP pattern disposed on the machine;
      determine a time stamp associated with the GCP, the time stamp indicating the time when an aerial image including the GCP was taken;
      detect a global location in the location history database that matches the time stamp and the machine identifier associated with the GCP; and
      record the detected global location as an accurate global location of the GCP.

15. The terrain mapping unit of claim 11, wherein the non-transitory memory is further configured to store instructions that enable the processor to:
    determine a time stamp associated with a GCP, the time stamp indicating the time when an aerial image including the GCP was taken;
    detect a global location in the location history database that matches the time stamp associated with the GCP, and is close to the estimated global location of the GCP; and
    record the detected global location as the accurate global location of the GCP.

16. A method for generating a terrain map of an area, comprising:
    capturing, by at least one camera on an aerial system, a plurality of aerial images of the area;
    periodically recording, by a plurality of machines moving around the area, global locations of a plurality of ground control points (GCPs) respectively disposed on the machines;
    constructing, by a mapping unit, a preliminary 3-dimensional (3D) terrain map based on the plurality of aerial images;
    detecting at least one GCP within at least one aerial image;
    determining an estimated global location of the at least one GCP in the preliminary 3D terrain map;
    determining an accurate global location of the at least one GCP;
    calibrating the preliminary 3D terrain map based on the estimated global location and the accurate global location of the at least one GCP; and
    outputting the calibrated 3D terrain map.

17. The method of claim 16, further including:
    when a GCP is detected within an aerial image, recording a global location and a time stamp of the aerial image, and two-dimensional (2D) coordinates of the GCP within the aerial image.

18. The method of claim 16, further including:
    projecting an aerial image including a GCP onto the preliminary 3D terrain map;
    obtaining 3D coordinates of the GCP projected onto the preliminary 3D terrain map; and
    recording the obtained 3D coordinates of the GCP as an estimated location of the GCP.

19. The method of claim 16, wherein each machine includes a GCP pattern associated with a unique machine identifier, and
    wherein the method further includes:
      determining a machine identifier associated with a machine having a GCP based on a GCP pattern disposed on the machine;
      determining a time stamp associated with the GCP, the time stamp indicating the time when an aerial image including the GCP was taken;
      detecting a global location in the location history database that matches the time stamp and the machine identifier associated with the GCP; and recording the detected global location as an accurate global location of the GCP.

20. The method of claim 16, further including:

determining a time stamp associated with a GCP, the time stamp indicating the time when an aerial image including the GCP was taken;

detecting a global location in the location history database that matches the time stamp associated with the GCP, and is close to the estimated global location of the GCP; and recording the detected global location as the accurate global location of the GCP.

* * * * *